(12) United States Patent
Moon et al.

(10) Patent No.: US 11,990,732 B2
(45) Date of Patent: May 21, 2024

(54) INTERLOCK DEVICE CONFIGURED TO OPEN OR CLOSE THE THROUGH HOLE LEVER INPUT PORTION OF AN AUTOMATIC TRANSFER SWITCH

(71) Applicant: O-SUNG ELECTRIC MACHINERY CO., LTD., Paju-si (KR)

(72) Inventors: Sunghwan Moon, Seoul (KR); Shin-o Hwang, Paju-si (KR)

( * ) Notice: Subject to any disclaimer, the term of this patent is extended or adjusted under 35 U.S.C. 154(b) by 283 days.

(21) Appl. No.: 17/503,316

(22) Filed: Oct. 17, 2021

(65) Prior Publication Data

US 2022/0239073 A1   Jul. 28, 2022

(30) Foreign Application Priority Data

Jan. 28, 2021 (KR) .......................... 10-2021-0012494

(51) Int. Cl.
  *H02B 1/14*   (2006.01)
(52) U.S. Cl.
  CPC ..................................... *H02B 1/14* (2013.01)
(58) Field of Classification Search
  CPC ... H02B 1/14–11/24; H01H 3/161–9/22; H02J 9/04
  See application file for complete search history.

(56) References Cited

U.S. PATENT DOCUMENTS

| 5,023,469 A | * | 6/1991 | Bassett | ..................... H02J 9/04 307/64 |
| 5,581,133 A | * | 12/1996 | Smith | ....................... H02J 9/00 307/64 |
| 7,903,393 B2 | * | 3/2011 | Buxton | .................. H02B 11/24 200/50.21 |
| 9,350,199 B2 | * | 5/2016 | Siciliano | ................... H02J 9/06 |
| 10,148,072 B2 | * | 12/2018 | Dolinski | ................... H02J 9/06 |

FOREIGN PATENT DOCUMENTS

| KR | 10-0844202 B1 | 6/2008 |
| KR | 10-2011-0087155 A | 8/2011 |
| KR | 10-1073681 B1 | 10/2011 |
| KR | 10-2013-0096571 A | 8/2013 |

* cited by examiner

*Primary Examiner* — Vanessa Girardi

(57) ABSTRACT

An interlock structure of a bypass transfer switching device is proposed. When supply power is bypassed through a bypass switch, the interlock structure may prevent manual switching on an automatic transfer switch, and allow the automatic transfer switch to be input into a switchboard when power input directions of the bypass switch and the automatic transfer switch match with each other. The interlock structure includes: the automatic transfer switch having a lever input portion for manual switching of a normal supply and an alternative supply; the bypass switch configured to bypass electric power of the normal supply or the alternative supply supplied to a load side through the automatic transfer switch; and an interlock device configured to automatically close the lever input portion when the bypass lever is operated.

5 Claims, 13 Drawing Sheets

INTERLOCK DEVICE CONFIGURED TO OPEN OR CLOSE THE THROUGH HOLE LEVER INPUT PORTION OF AN AUTOMATIC TRANSFER SWITCH

CROSS REFERENCE TO RELATED APPLICATION

The present application claims priority to Korean Patent Application No. 10-2021-0012494, filed Jan. 28, 2021, the entire contents of which is incorporated herein for all purposes by this reference.

BACKGROUND OF THE INVENTION

Field of the Invention

The present disclosure relates generally to an interlock structure of a bypass transfer switching device and, more particularly, to an interlock structure of a bypass transfer switching device capable of performing physical prevention of manual switching on an automatic transfer switch when supply power is bypassed, and capable of allowing the automatic transfer switch to be input into a switchboard when power input directions of a bypass switch and the automatic transfer switch match with each other.

Description of the Related Art

In general, a large building or a factory receives a normal supply from a source of a power supply such as Korea Electric Power Corporation. When an abnormality like a power outage occurs in the normal supply, the above facilities generate an alternative supply using a power generator provided inside. In a large building or the factory, an automatic transfer switching device including an automatic transfer switch (ATS) is provided to supply electric power to a load side by connecting the normal supply to the load side in normal times and to supply emergency electric power to the load side by connecting the alternative supply to the load side when an abnormality occurs in a source of the normal supply. The automatic transfer switching device consists of automatic transfer switches connected to each other in parallel. When an error occurs in one of the automatic transfer switches, the automatic transfer switching device performs switching to supply a power supply through another automatic transfer switch arranged in parallel. Accordingly, the automatic transfer switching device is provided as a bypass transfer switching device so that maintenance, testing, etc. of an automatic transfer switch with an error may be efficiently performed.

As shown in FIG. 1, the bypass transfer switching device has an automatic transfer switch 10 and a bypass switch 20 in a switchboard 30. As shown in FIG. 2, at an fixed terminal portion of each switch 10, 20, a normal supply terminal 10-1, 20-1 provided to supply the normal supply and an alternative supply terminal 10-2, 20-2 provided to supply the alternative supply, and a load terminal 10-3, 20-3 provided to supply a power supply to the load supply are wired in parallel connection, so that a moving terminal 10-4, 20-4 provided at the switch 10, 20 performs switching to the power supply terminal 10-1, 10-2, 20-1, and 20-2. As shown in FIG. 1, a lever input portion 10a is provided at a front surface of the automatic transfer switch 10 and administrator inputs a lever to the lever input portion 10a, thereby manually switching a power supply of the automatic transfer switch 10. Meanwhile, when maintenance, repair, or testing of the automatic transfer switch 10 is required, the bypass transfer switching device performs switching so that a power supply is supplied without a cut-off to the load side through the bypass switch 20. Therefore, maintenance, repair, or testing of the automatic transfer switch 10 may be efficiently performed.

However, the conventional bypass transfer switching device described above has following problems.

First, when the administrator switches the bypass switch 20 into the normal supply or the alternative supply in order to perform maintenance, repair, testing, etc. of the automatic transfer switch, without recognizing that the bypass switch 20 is switched, the administrator or an operator may input the lever into the lever input portion 10a to manually switch a power supply of the automatic transfer switch 10, so there is a problem causing a fire accident in addition to a damage of an apparatus such as a power supply apparatus, etc. The bypass transfer switching device does not have a problem when an input power supply of the bypass switch 20 and an input power supply of the automatic transfer switch match with each other. However, when the operator performs manual switching of the automatic transfer switch through the lever input portion 10a from carelessness in the state in which the input power supply of the bypass switch 20 and the input power supply of the automatic transfer switch do not match with each other, there may be a problem causing a large accident.

Second, in a process that the administrator draws the automatic transfer switch 10 from the switchboard in a state in which a power supply is bypassed using the bypass switch 20 and performs testing or maintenance of the automatic transfer switch 10 and then returns the automatic transfer switch 10 to the switchboard, when an input power supply of the bypass switch 20 and an input power supply of the automatic transfer switch 10 do not match with each other, the bypass transfer switching device may have a problem of causing the above-described accidents. The administrator performs testing or maintenance while drawing the automatic transfer switch 10 from the switchboard 30 and then inputting the normal supply or the alternative supply to the automatic transfer switch 10. When the operator returns the automatic transfer switch 10 into the switchboard 30 after completion of a series of operations, mismatch between the input power supply of the automatic transfer switch 10 and the input power supply of the bypass switch 20 may lead to an accident such as a damage of an apparatus and a fire accident.

SUMMARY OF THE INVENTION

Accordingly, the present disclosure has been made keeping in mind the above problems occurring in the related art, and the present disclosure is intended to provide an interlock structure of a bypass transfer switching device, wherein when supply power is bypassed through a bypass switch, a lever input portion of an automatic transfer switch is automatically closed to fundamentally prevent manual switching of the automatic transfer switch.

In order to achieve the above object, according to one aspect of the present disclosure, there is provided an interlock structure of a bypass transfer switching device. The interlock structure of the bypass transfer switching device includes: an automatic transfer switch having a lever input portion of a through hole shape for manual switching of a normal supply and an alternative supply; a bypass switch configured to bypass electric power of the normal supply or the alternative supply supplied to a load side through the automatic transfer switch, the bypass switch including a bypass lever capable of manually switching a bypass circuit; and an interlock device configured to automatically close the lever input portion when the bypass lever is operated, wherein the interlock device includes: a main bar shaft-coupled to the bypass lever and configured to raise and lower the automatic transfer switch by a turning operation of the bypass lever; an elevation member configured to be raised and lowered in a height direction of the automatic transfer switch while being in conjunction with raising and lowering movement of the main bar, and having an inclined surface formed toward the lever input portion; and an opening and closing plate configured to open and close the lever input portion while being moved toward the lever input portion or returned to an initial location thereof along the inclined surface of the elevation member by a raising and lowering operation of the elevation member.

The interlock structure of the bypass transfer switching device according to the present disclosure is configured to automatically close the lever input portion of the automatic transfer switch when supply power is bypassed through the bypass switch. Therefore, it is possible to fundamentally prevent an operator from manually switching power supplies of the automatic transfer switch. Accordingly, the present disclosure has an effect that a damage to an apparatus at a load side or a fire accident due to mismatch between an input power supply of the bypass switch and an input power supply of the automatic transfer switch does not occur during repair and testing of the automatic transfer switch.

Furthermore, the interlock structure of the present disclosure is configured such that, when supply power is bypassed through the bypass switch, the automatic transfer switch may input into a switchboard only when a power input direction of the automatic transfer switch drawn from the switchboard and a power input direction of the bypass switch match with each other. Accordingly, damage to an apparatus and an accident due to mismatch between the input power of the bypass switch and the input power of the automatic transfer switch can be prevented.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
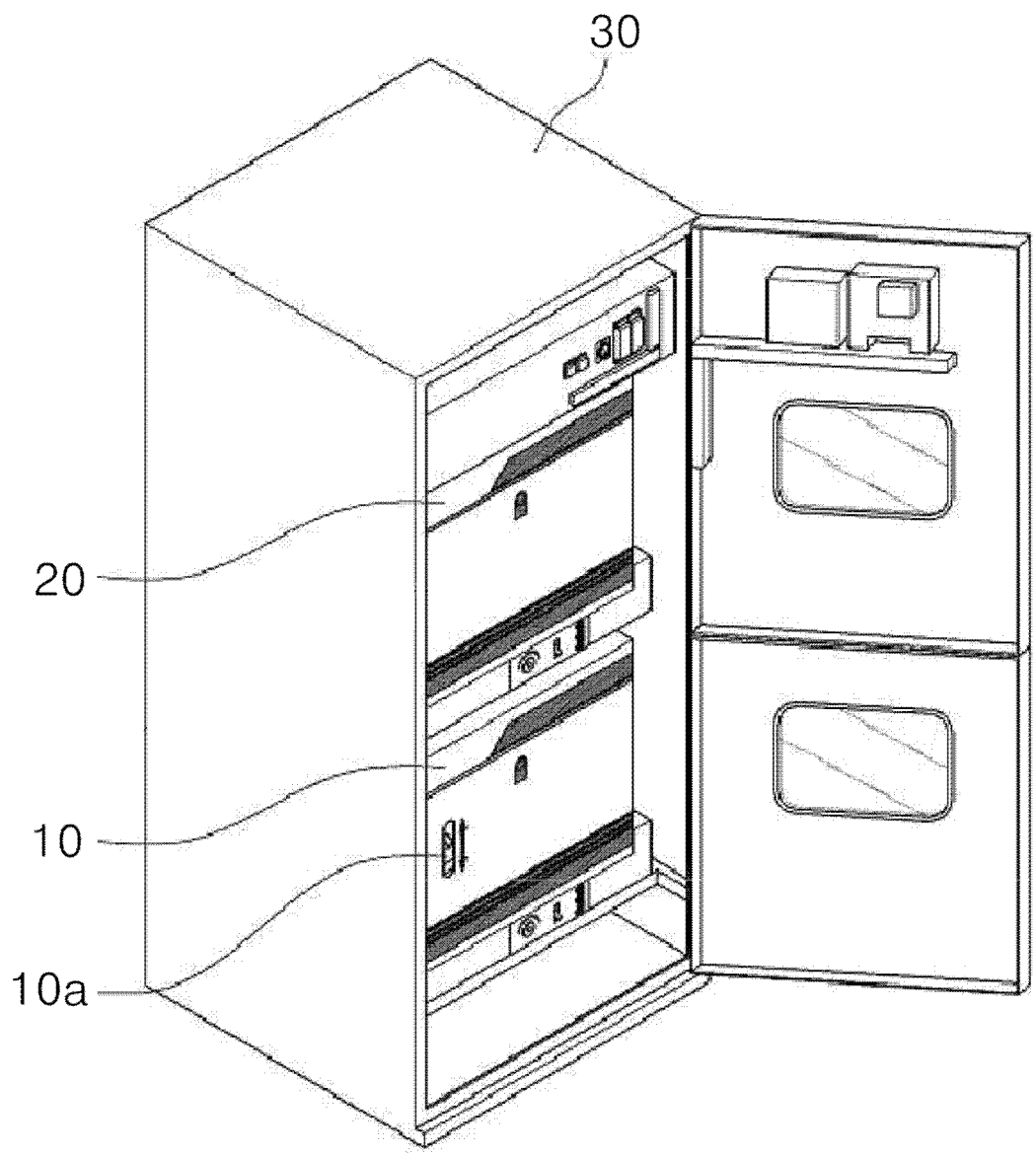
FIG. 1 is a view showing a bypass transfer switching device.
Figure 2:
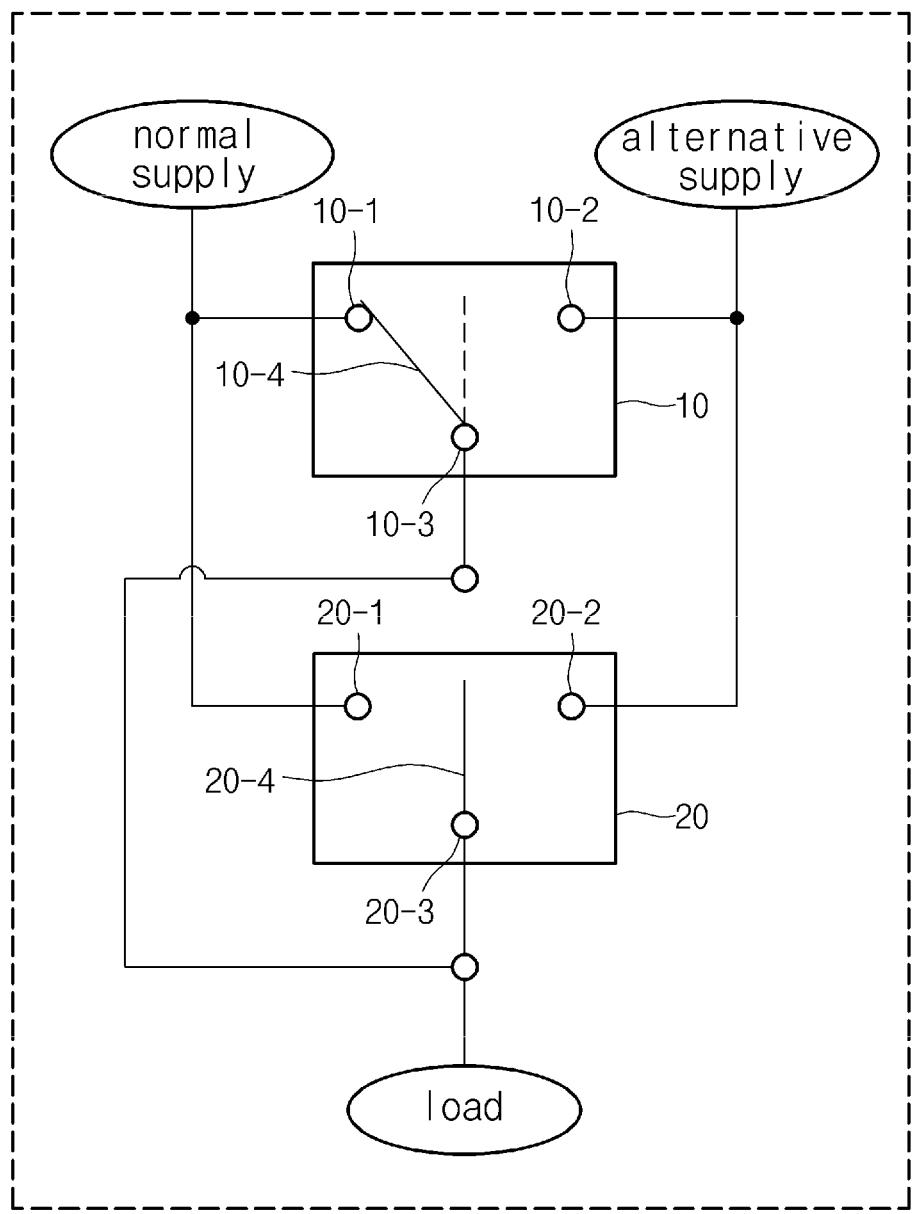
FIG. 2 is a view showing a circuit structure of the bypass transfer switching device.

It should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present disclosure.

Hereinbelow, an interlock structure of the bypass transfer switching device (hereinbelow, the interlock structure of the bypass transfer switching device refers to 'the interlock structure') according to an exemplary embodiment of the present disclosure will be described with reference to FIGS. 3 to 10.

Figure 3:
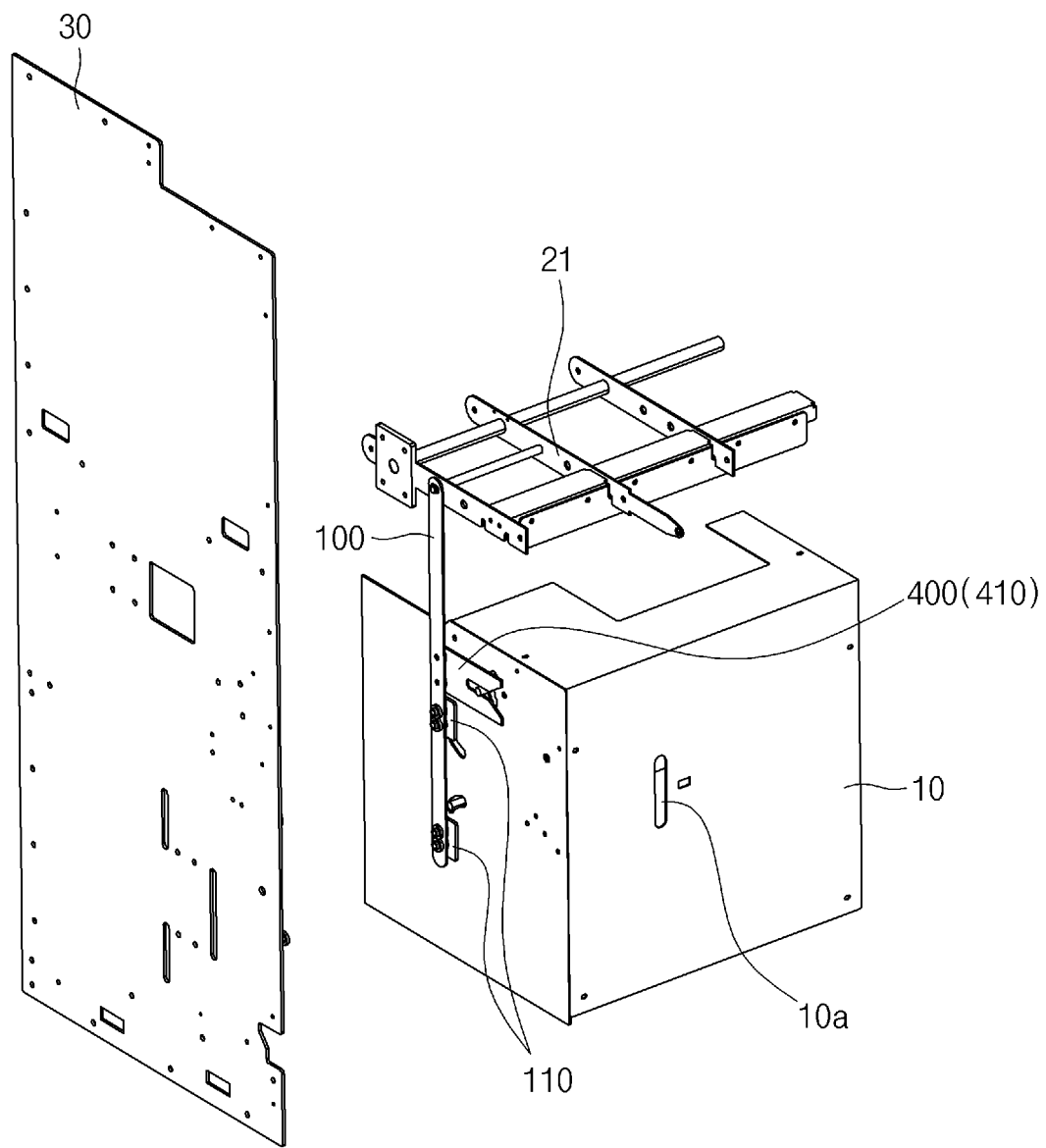
FIG. 3 is a view showing an installed state of an interlock structure of the bypass transfer switching device according to an exemplary embodiment of the present disclosure.
Figure 4:
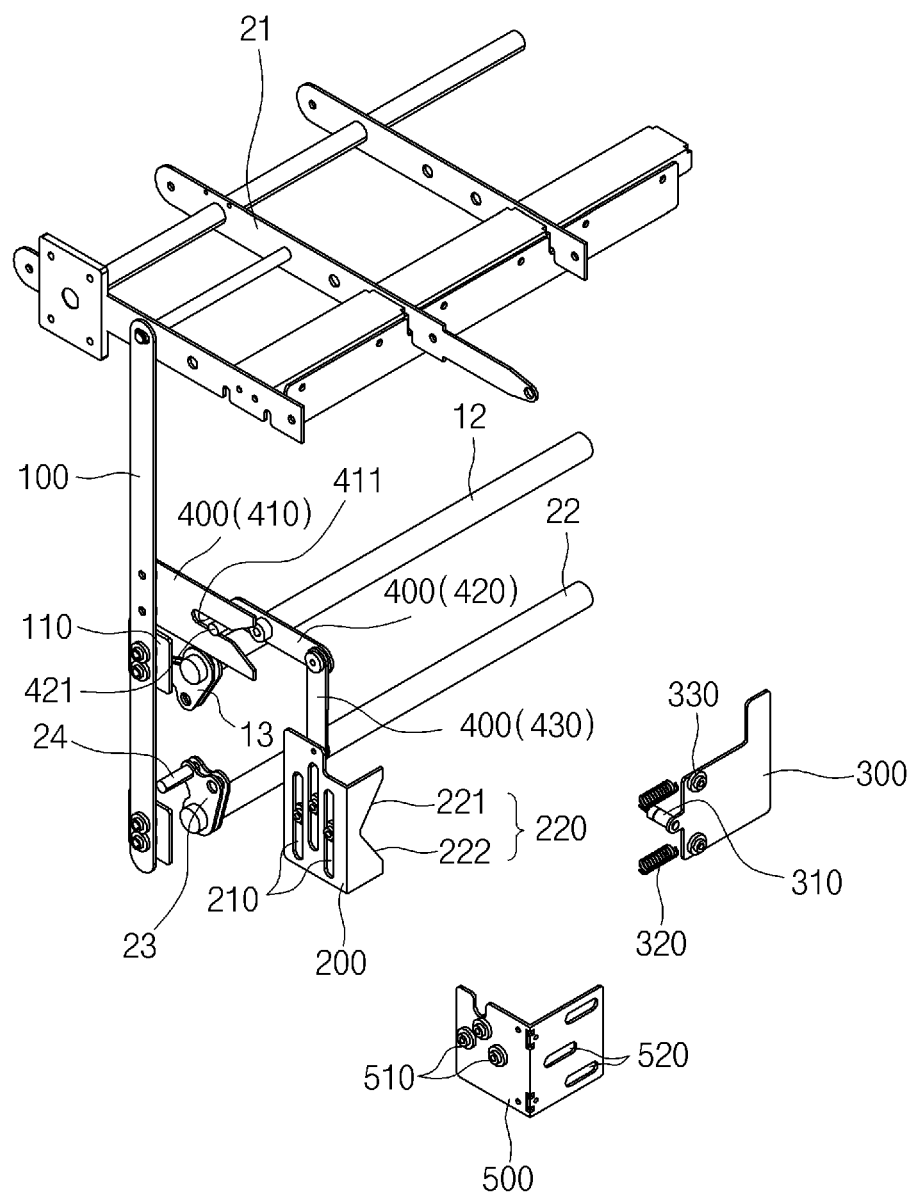
FIG. 4 is a front perspective view showing the interlock structure of the bypass transfer switching device according to the exemplary embodiment of the present disclosure.
Figure 6A:
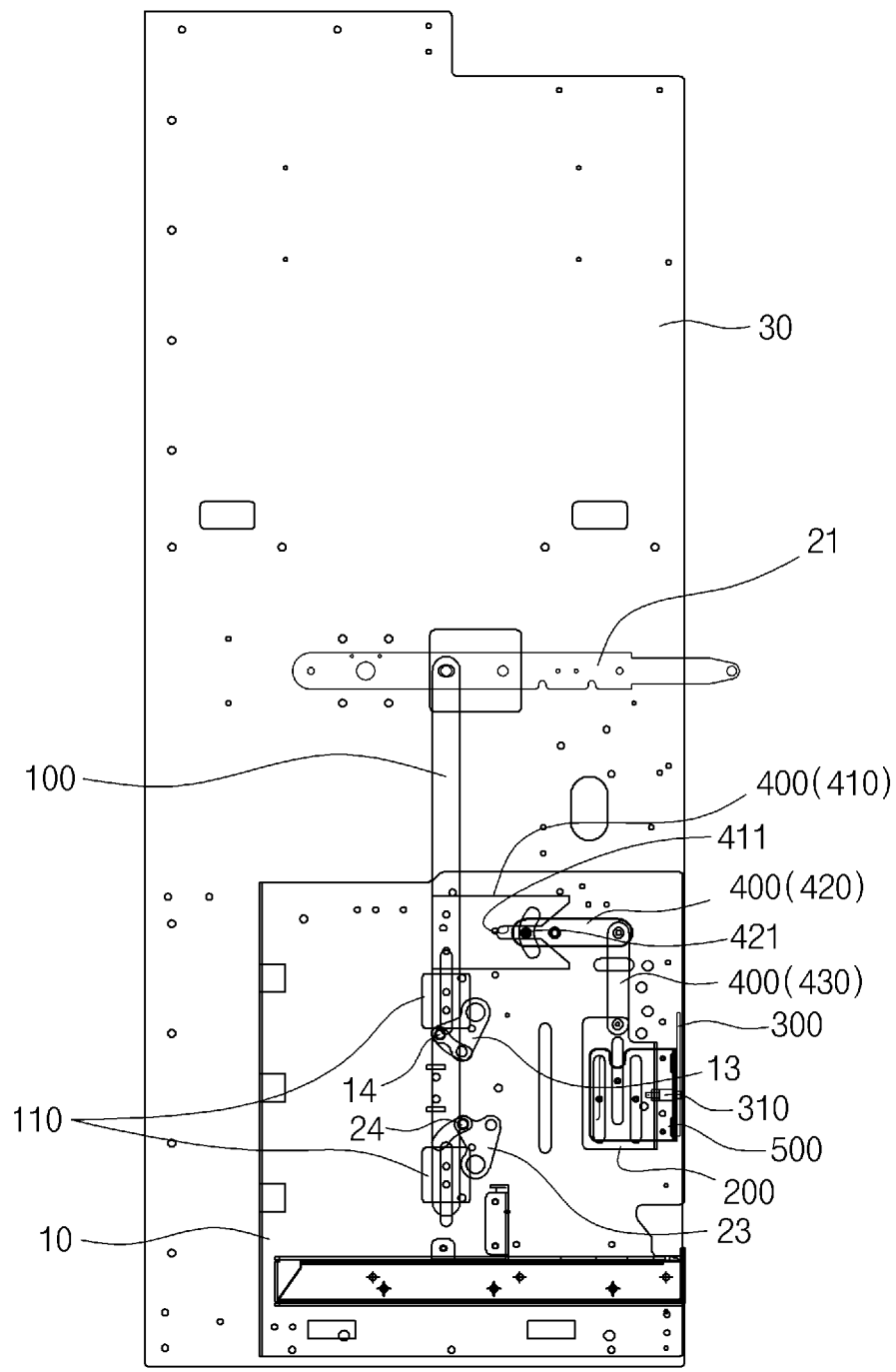
FIGS. 6A and 6B are a side view and a front view showing the interlock structure of the bypass transfer switching device with an automatic transfer switch in an operated state according to the exemplary embodiment of the present disclosure.
Figure 7A:
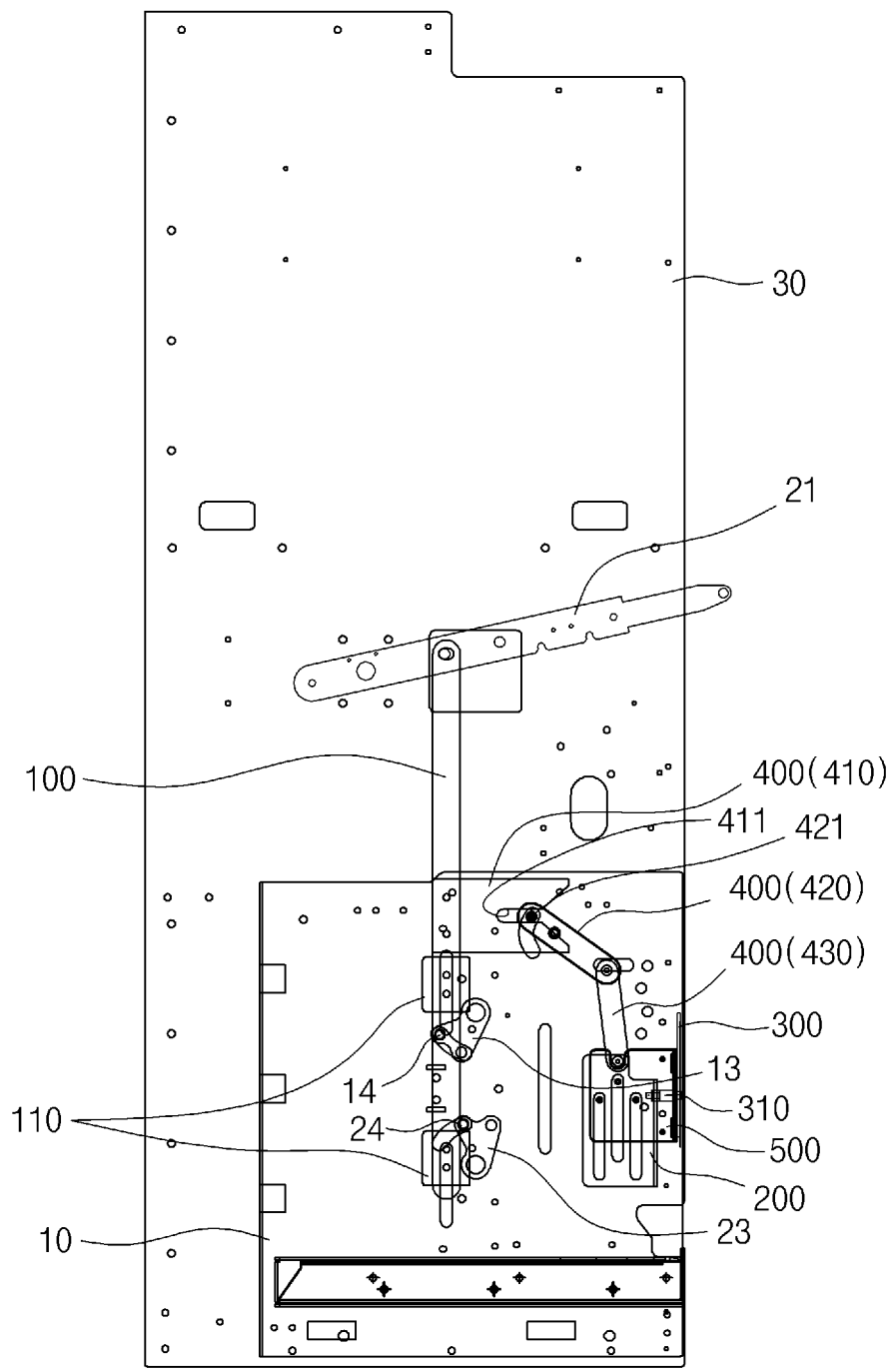
FIGS. 7A and 7B are a side view and a front view showing the interlock structure of the bypass transfer switching device according to the exemplary embodiment of the present disclosure in a state in which power is bypassed to a normal supply through a bypass switch.
Figure 8A:
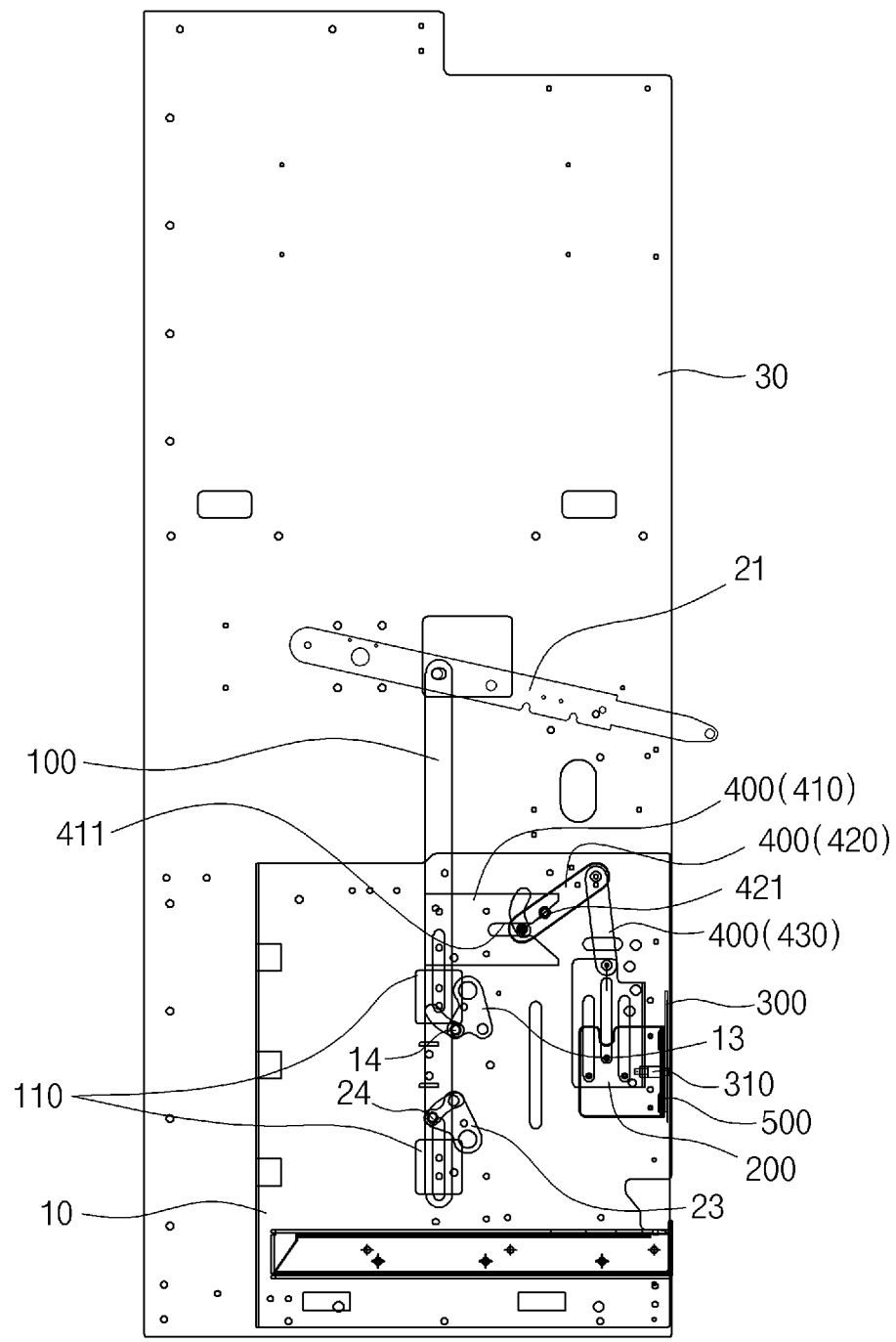
FIGS. 8A and 8B are a side view and a front view showing the bypass transfer switching device of the interlock structure according to the exemplary embodiment of the present disclosure in a state in which power is bypassed to an alternative supply through the bypass switch.

With the bypass transfer switching device in which an automatic transfer switch 10 and a bypass switch 20 are connected to each other in parallel, the interlock structure includes an interlock device capable of closing a lever input portion 10a formed in the automatic transfer switch 10, as shown in FIGS. 3 and 4. The bypass switch 20 includes a bypass lever 21 capable of switching an input direction of the bypass switch 20, the bypass lever 21 is provided to be turned upward and downward in a switchboard 30, as shown in FIGS. 6A, 7A, and 8A. For example, when the bypass lever 21 is turned upward in the switchboard 30, a normal supply is bypassed to the bypass switch 20, and when the bypass lever 21 is turned downward in the switchboard 30, an alternative supply is bypassed to the bypass switch.

As shown in FIG. 4, the interlock device includes a main bar 100, an elevation member 200, an opening and closing plate 300, an interlock means 400, and the guide means 500.

The main bar 100 is configured to transmit a turning operation of the bypass lever 21 to the opening and closing plate 300, and is provided between the bypass lever 21 and the interlock means 400, which will be described later. The main bar 100 is provided in a direction perpendicular to the bypass lever 21. The main bar 100 is shaft-coupled to the bypass lever 21, and when the bypass lever 21 is turned normally and reversely, the main bar 100 is raised and lowered in a height direction of the switchboard 30 at a side portion in the switchboard 30.

Figure 5:
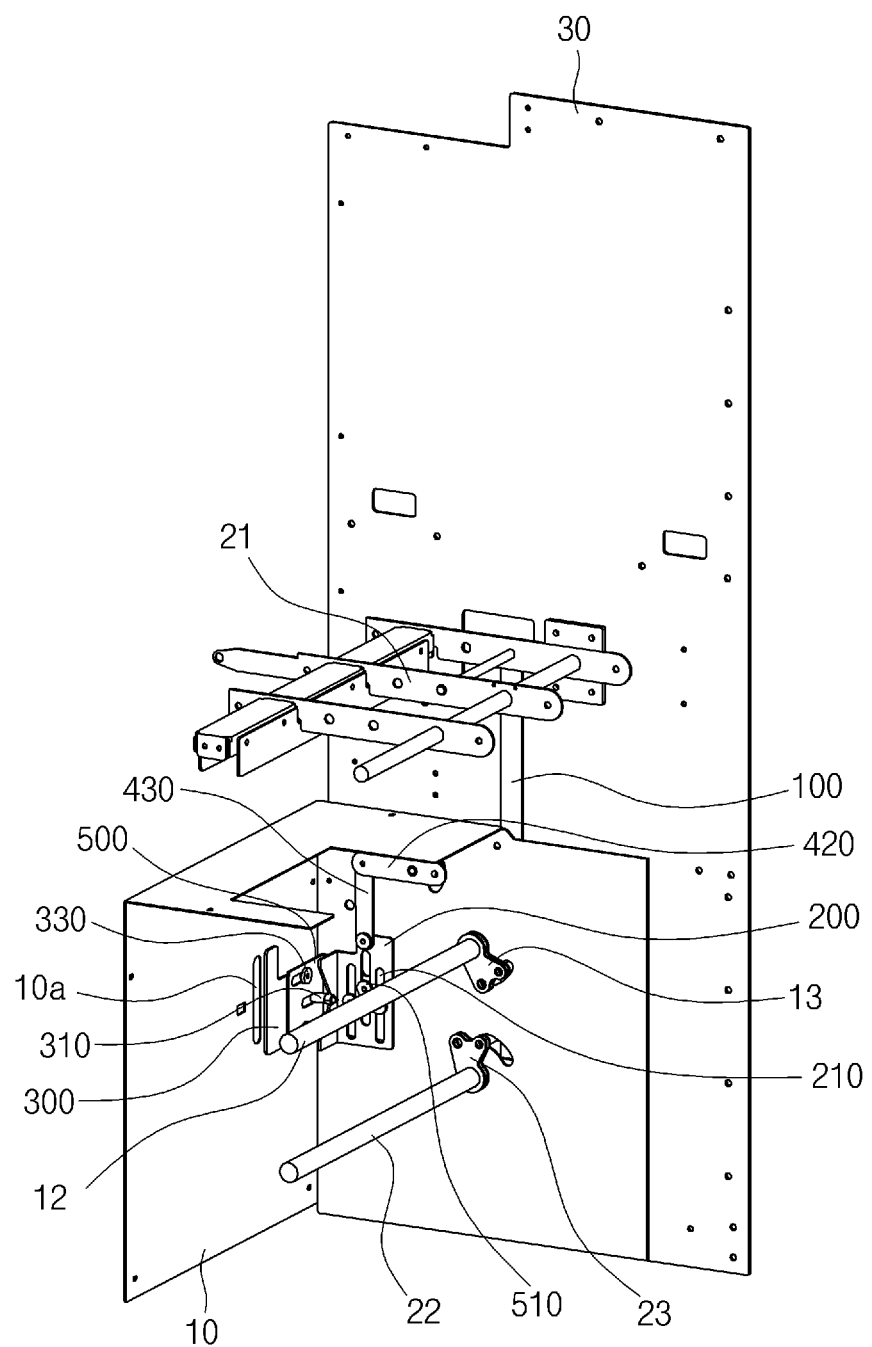
FIG. 5 is a rear perspective view showing the interlock structure of the bypass transfer switching device according to the exemplary embodiment of the present disclosure.

The elevation member 200 is raised and lower by a raising and lowering operation of the main bar 100, and serves to push or pull the opening and closing plate 300. The elevation member 200 is raised and lowered by the interlock means 400, which will be described later. As shown in FIGS. 4 and 5, the elevation member 200 has a panel shape bent along a side portion and a front surface of the automatic transfer switch 10. An elevation hole 210 is provided at a first side of the elevation member 200 corresponding to the side surface of the switchboard 30 to be coupled to the guide means 500 so that the raising and lowering operation of the elevation member 200 is efficiently performed. The elevation hole 210 allows rollers of the guide means 500, which will be described later, to be rotatable while being inserted in the elevation hole, so the elevation member 200 may be efficiently raised and lowered. The longitudinal elevation hole 210 is formed in a height direction of the elevation member 200 and preferably includes a plurality of elevation holes. An inclined surface 220 is formed on a second side of the elevation member 200 corresponding to a front surface of the switchboard 30. The inclined surface 220 is formed toward the lever input portion 10a of the automatic transfer switch 10 and is formed at an angle that is symmetric in a vertical direction with a center portion of the elevation member 200 as the center. The inclined surface 220 is formed such that upper and lower widths thereof are gradually increased toward the lever input portion 10a with the center portion of the second side of the elevation member 200 as the center. The inclined surface 220 may be divided into an upper inclined surface 221 and a lower inclined surface 222 with the center portion of the elevation member 200 as the center.

Figure 6B:
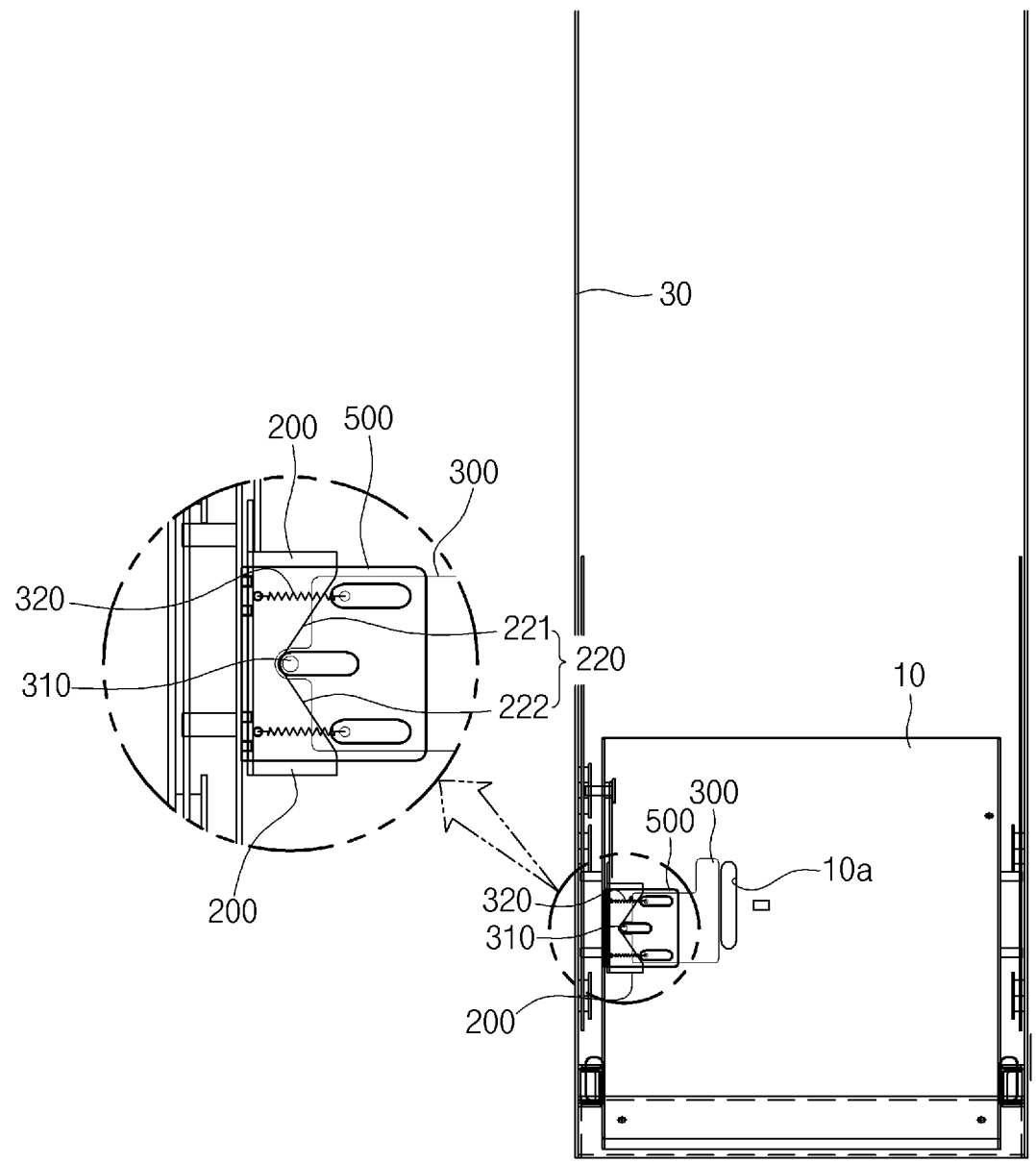

The opening and closing plate 300 is configured to effectively close the lever input portion 10a by the turning operation of the bypass lever 21. The opening and closing plate 300 is located in rear of a front panel of the automatic transfer switch 10 and is configured to be reciprocatively moved toward the lever input portion 10a. It is safe to form the opening and closing plate 300 in a shape capable of closing the lever input portion 10a, and a guide bar 310 is provided at a first side of the opening and closing plate 300 as shown in FIG. 5. The guide bar 310 is configured such that the opening and closing plate 300 may be operated in conjunction with the raising and lowering operation of the elevation member 200, and the guide bar 310 is formed by protruding outward from the opening and closing plate 300. The guide bar 310 is located at the center portion of the elevation member 200 where the inclined surface 220 of the elevation member 200 begins, and the guide bar 310 may be moved along the inclined surface 220 when the elevation member 200 is raised and lowered. The opening and closing plate 300 has springs 320 so that the reciprocating movement of the opening and closing plate 300 is efficiently performed, as shown in FIG. 6B. The opening and closing plate 300 has rollers 330 to allow the opening and closing plate 300 to reciprocate smoothly, as shown in FIG. 4.

The interlock means 400 serves to transmit the raising and lowering operation of the main bar 100 to the elevation member 200 and may be located between the main bar 100 and the elevation member 200. As shown in FIG. 4, the interlock means 400 includes an interruption member 410, a first link 420, and a second link 430. The interruption member 410 has a longitudinal groove 411 protruding outward from the main bar 100 and being open toward the front of the switchboard 30. A first end of the first link 420 is located in the longitudinal groove 411, and the longitudinal groove 411 is configured such that turning operation of the first link 420 according to the raising and lowering movement of the interruption member 410 is efficiently performed without interruption. The first link 420 is shaft-coupled to a portion inside the automatic transfer switch 10 and is configured to be turned in a height direction of the main bar 100, i.e. a raising and lowering direction of the main bar 100 by the raising and lowering operation of the interruption member 410. The first end of the first link 420 is located in the longitudinal groove 411 of the interruption member 410 as described above, and more precisely, an interruption protrusion 421 protrudes outward on the first end of the first link 420. The interruption protrusion 421 is located in the longitudinal groove 411 to allow the movement of the interruption member 410 to be transmitted to the first link 420 through the interruption protrusion 421. The second link 430 is operated in conjunction with the movement of the first link 420 and is provided between the first link 420 and the elevation member 200. A first end of the second link 430 is shaft-coupled to a second end of the first link 420, and a second end of the second link 430 is shaft-coupled to the elevation member 200. With the above-described structure, when the first link 420 is turned on a shaft, the second link 430 performs the operation of pushing downward or pulling upward the elevation member 200.

The guide means 500 serves to guide the elevation member 200 and the opening and closing plate 300, so that the elevation member 200 efficiently performs the raising and lowering operation and the opening and closing plate 300 efficiently performs the reciprocating movement. In other words, the guide means 500 serves to guide a raising and lowering path of the elevation member 200 and a movement path of the opening and closing plate 300. As shown in FIGS. 4 and 5, the guide means 500 is formed in a shape bent along a side portion and the front surface of the automatic transfer switch 10. The guide means 500 has rollers 510 at a first side thereof, and the rollers 510 is provided to be rolled along the elevation hole 210 of the elevation member 200. In other words, when the elevation member 200 is raised and lowered, the rollers 510 of the guide means 500 is rolled along the elevation hole 210, whereby the elevation member 200 may be efficiently raised and lowered. The guide means 500 has guide holes 520 at a second side thereof. The guide holes 520 is configured to allow the rollers 330 provided at the opening and closing plate 300 to be rolled, thereby allowing the opening and closing plate 300 to be efficiently moved during the reciprocating movement thereof.

Hereinbelow, the operation of the interlock structure having the above-described structure will be described.

FIGS. 6A and 6B are a side view and a front view showing an operating state the automatic transfer switch 10 in a state in which power is normally supplied. As shown in the drawings, the bypass lever 21 is in a state in which the bypass lever 21 is not connected to any power supply of the bypass switch 20. The lever input portion 10a is in an open state so that manual switching of the automatic transfer switch 10 may be performed. When the automatic transfer switch 10 in the above-described open state of the lever input portion 10a needs maintenance, testing, etc., an operator bypasses a power supply, which is supplied through the automatic transfer switch 10, through the bypass switch 20.

For example, as shown in FIG. 7A, the operator turns the bypass lever 21 upward to bypass the normal supply from the automatic transfer switch 10 to the bypass switch 20. The main bar 100 is raised to the upper portion of the switchboard 30 with the interruption member 410, as the bypass lever 21 is turned upward. The interruption protrusion 421 of the first link 420 is located in the longitudinal groove 411 of the interruption member 410, thereby allowing the first link 420 to be turned upward in conjunction with the interruption member 410. When the first link 420 is turned as described above, a first end of the first link 420 is raised and a second end thereof is lowered, as shown in FIGS. 6A and 7A. When the second end of the first link 420 is lowered, the elevation member 200 is lowered to a lower portion of the switchboard 30, and lowering movement of the elevation member 200 may be supply performed as the rollers 510 are rolled along the elevation hole 210.

Figure 7B:
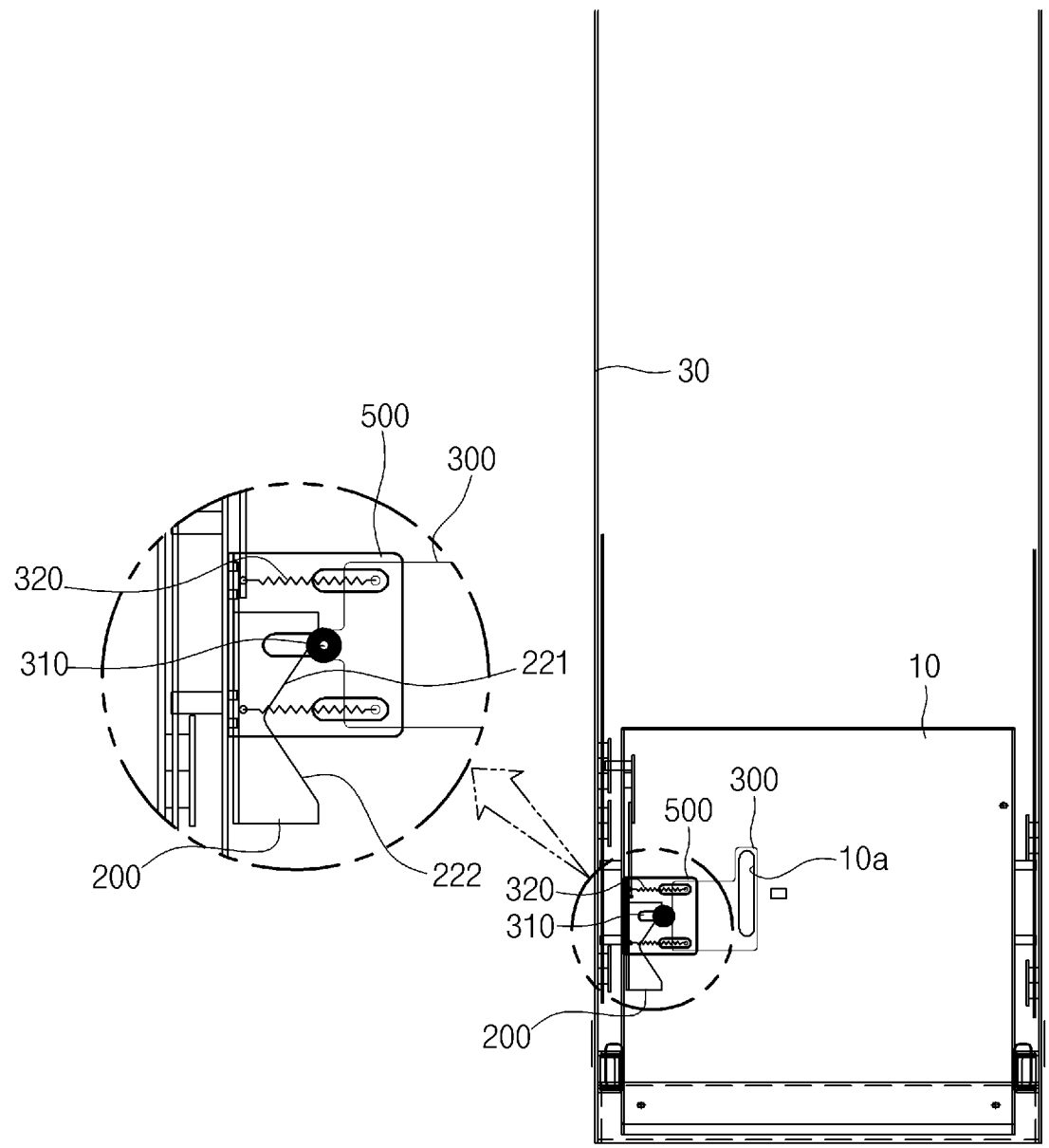

When the elevation member 200 is lowered, the guide bar 310 of the opening and closing plate 300 is moved by being guided along the upper inclined surface 221 of the elevation member 200. The opening and closing plate 300 is moved by a distance in which the guide bar 310 is moved along the upper inclined surface 221, as shown in FIGS. 6A and 7B. In other words, the opening and closing plate 300 is moved rightward along the guide holes 520 of the guide means 500 while extending the springs 320, thereby closing the lever input portion 10a. Accordingly, according to the present disclosure, when the bypass lever 21 bypasses a power supply of the automatic transfer switch 10, the opening and closing plate 300 automatically closes the lever input portion 10a while being operated in conjunction with the operation of the bypass lever 21, so that the manual switching for the automatic transfer switch 10 is completely blocked. Then, the operator performs a series of operations on the automatic transfer switch 10, and when the operations are completed, the operator returns the bypass lever 21 to an initial location thereof, as shown in FIG. 6A.

Figure 8B:
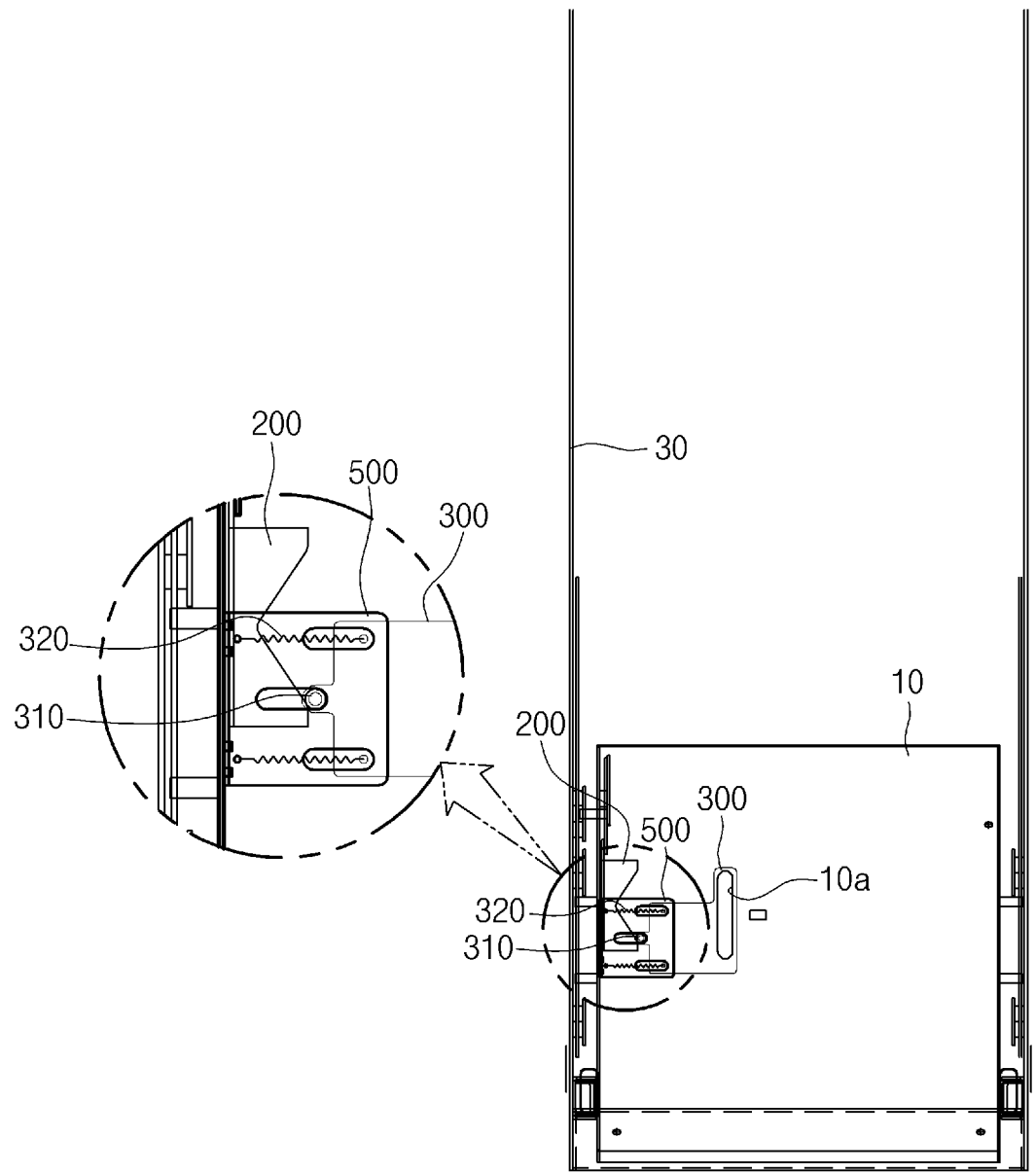

Meanwhile, the operator turns the bypass lever 21 downward as shown in FIGS. 8A, so that the alternative supply may be bypassed from the automatic transfer switch 10 to the bypass switch 20. The main bar 100 is lowered with the interruption member 410 to the lower portion of the switchboard 30. The first link 420 is turned to raise the second end thereof by the downward movement of the interruption member 410 as shown in FIGS. 6A and 8A. When the second end of the first link 420 is raised, the elevation member 200 is raised toward the upper portion of the switchboard 30. When the elevation member 200 is raised, the guide bar 310 of the opening and closing plate 300 is moved by being guided along the lower inclined surface 222 of the elevation member 200. The opening and closing plate 300 is moved as a distance in which the guide bar 310 is moved along the lower inclined surface 222 to close the lever input portion 10a as shown in FIGS. 6B and 8B.

As known in the operation of the interlock device, in the present disclosure, regardless of whether the bypass lever 21 bypasses the normal supply or bypasses the alternative supply, when supply power is bypassed, the opening and closing plate 300 is automatically moved to close the lever input portion 10a. When a power supply of the automatic transfer switch 10 is bypassed, the present disclosure is configured to close the lever input portion 10a unconditionally, whereby it is possible to completely prevent the operator from manually switching the automatic transfer switch 10 inadvertently.

Meanwhile, according to the present disclosure, in a process in which the automatic transfer switch 10 is drawn from the switchboard 30 and undergoes repair or testing after the power supply of the automatic transfer switch 10 is bypassed, when an input power supply of the automatic transfer switch 10 and an input power supply of the bypass switch 20 are different from each other, it is possible to prevent the automatic transfer switch 10 from being returned to the switchboard 30. As described above, the technical feature of the present disclosure is also provided to prevent equipment damages and accidents caused by difference between the input power supply of the automatic transfer switch 10 and the input power supply of the bypass switch 20.

Therefore, as shown in FIG. 4, the automatic transfer switch 10 of the present disclosure includes a normal supply rotary shaft 12 and an alternative supply rotary shaft 22 for inputting of the normal supply and the alternative supply. The normal supply rotary shaft 12 and the alternative supply rotary shaft 22 are arranged in a height direction from each other. A cam link 13, 23 is provided at an end of each of the normal supply rotary shaft 12 and the alternative supply rotary shaft 22, and the cam link 13, 23 is operated in conjunction with the rotation of each rotary shaft 12, 22. A cam link 13 of the normal supply rotary shaft 12 and a cam link 23 of the alternative supply rotary shaft 22 are arranged while being in a symmetrical state from each other and, more particularly, eccentric portions thereof face each other. The cam link 13, 23 has a restraining protrusion 14, 24 formed by protruding outward. The restraining protrusion 14, 24 is formed by protruding from the cam link 13, 23 toward the main bar 100, and may be provided to be interrupted with each of the stoppers.

The main bar 100 has stoppers 110 in a height direction of the main bar 100. The stoppers 110 are configured to interrupt with the restraining protrusions 14 and 24 and a plurality of stoppers 110 is provided in the main bar 100. In detail, two stoppers 110 are provided at the main bar 100, and an interval between the stoppers 110 corresponds to a gap between the restraining protrusions 14 and 24 arranged between the normal supply rotary shaft 12 and the alternative supply rotary shaft 22, and the stoppers 110 the stoppers 110 is configured to interrupt with the restraining protrusions 14 and 24 provided at the normal supply rotary shaft 12 and the alternative supply rotary shaft 22 when the main bar 100 is raised and lowered by the turning operation of the bypass lever 21.

Hereinbelow, the operation in which the automatic transfer switch 10 of the bypass transfer switching device that includes the stoppers 110 and the restraining protrusions 14 and 24 enters and exits from the switchboard 30 will be described.

Figure 9:
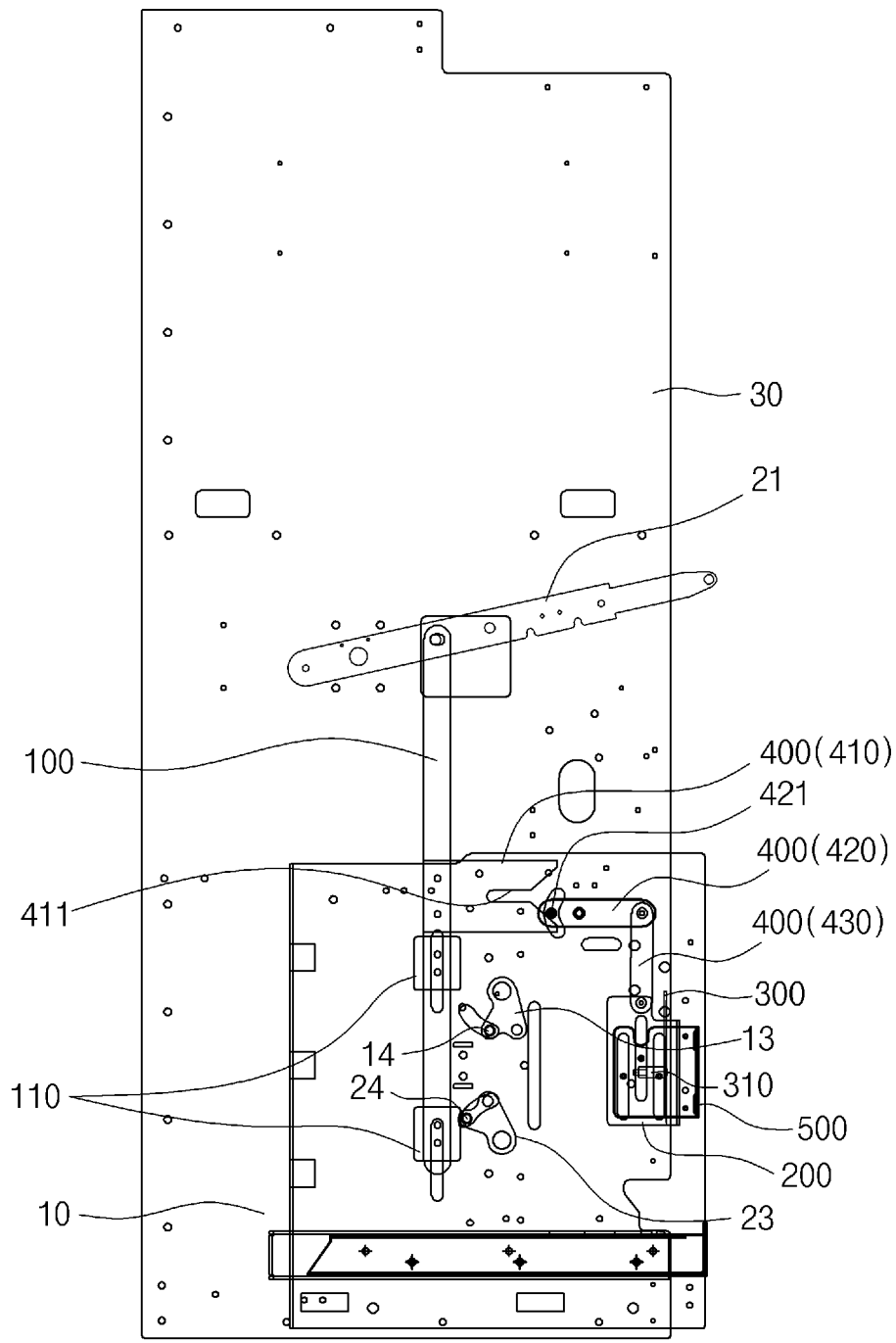
FIG. 9 is a view showing a state in which a power supply of the automatic transfer switch drawn from a switchboard is input to the alternative supply while a power supply is bypassed to the normal supply through the bypass switch.

FIG. 6A is a view showing a state in which the automatic transfer switch 10 is normally operated. The restraining protrusions 14 and 24 of the normal supply rotary shaft 12 and the alternative supply rotary shaft 22 are located between the stoppers 110, so that the input of the automatic transfer switch 10 into the switchboard 30 is free. The operator draws the automatic transfer switch 10 from the switchboard 30 while bypassing the normal supply, as shown in FIG. 9, and then performs a series of operations. For example, the operator draws the automatic transfer switch 10 from the switchboard 30 and then performs various operations while changing an input power supply of the automatic transfer switch 10. However, a main circuit is in a connected state through the bypass switch 20, so even when the automatic transfer switch 10 is drawn from the switchboard 30, power supply may be performed without problems. Then, when a series of operations on the automatic transfer switch 10 is completed, the operator returns the automatic transfer switch 10 to the switchboard. As shown in FIG. 9, the bypass lever 21 is turned upward to bypass the normal supply, and an input direction of a power supply of the automatic transfer switch 10 is arranged such that the alternative supply rotary shaft 22 is rotated to allow the cam link 23 faces the alternative supply. Accordingly, the restraining protrusion 24 provided at the alternative supply rotary shaft 22 is interrupted by a lower stopper 110 of the main bar 100. Accordingly, the automatic transfer switch 10 drawn from the switchboard 30 is not input into the switchboard 30 unless the operator rotates the alternative supply rotary shaft 22 rotated in the input direction of the alternative supply in an opening direction.

Figure 10:
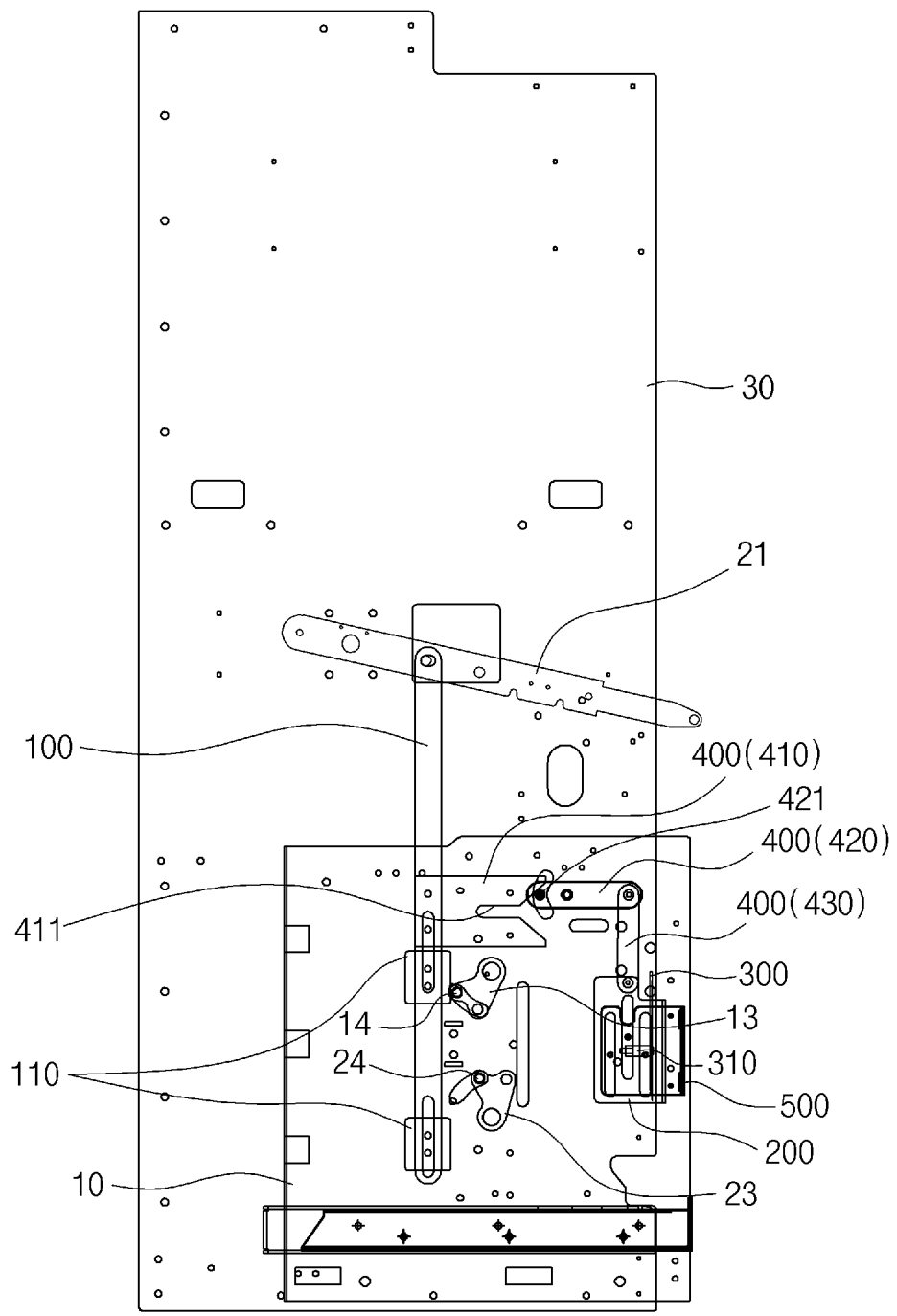
FIG. 10 is a view showing a state in which a power supply of the automatic transfer switch drawn from the switchboard is input to the normal supply while power is bypassed to the alternative supply through the bypass switch.

As shown in FIG. 10, in a case in which the normal supply rotary shaft 12 of the automatic transfer switch 10 is rotated for input of the normal supply while the bypass lever 21 is turned downward to bypass the alternative supply, the restraining protrusion 14 of the normal supply rotary shaft 12 is interrupted by an upper stopper 110 of the main bar 100 to prevent the automatic transfer switch from being input into the switchboard 30 unless the operator rotates the normal supply rotary shaft 12 rotated in an input direction of the normal supply in an opening direction.

As described above, the interlock structure of the bypass transfer switching device according to the present disclosure is configured such that, when the supply power is bypassed, the lever input portion of the automatic transfer switch is automatically closed regardless of the bypassed power supply. When a power supply of the automatic transfer switch drawn from the switchboard and the bypassed power supply do not match with each other, the interlock structure of the bypass transfer switching device according to the present disclosure is configured to prevent the automatic transfer switch from being input into the switchboard. Accordingly, the present disclosure is configured to prevent device damages and safety accidents such as an electric shock to the operator when supply power is bypassed for performing repair, maintenance, testing, etc. on the automatic transfer switch.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. An interlock device within an automatic transfer switch employing a bypass switch with manual switching capability through the use of a bypass lever, the interlock device comprising:
    a main bar shaft-coupled to the bypass lever;
    an elevation member comprising an inclined surface; and
    an opening and closing plate,
    wherein the elevation member is raised and lowered in a height direction in response to movement of the main bar shaft-coupled to the bypass lever; and
    wherein the opening and closing plate moves along the inclined surface to either provide or block access to a through hole within the automatic transfer switch where the through hole is a lever input portion for manual switching operations of the automatic transfer switch.

2. The interlock device of claim 1, wherein the inclined surface has a shape in which widths of upper and lower portions thereof are gradually increased toward the lever input portion from a center portion of the elevation member.

3. The interlock device of claim 2, wherein the opening and closing plate comprises:
    a guide bar capable of being guided along an upper inclined surface and a lower inclined surface of the elevation member, and
    a spring supplying an elastic force for movement of the opening and closing plate moved toward the lever input portion.

4. The interlock device of claim 1, further comprising an interlock means provided between the main bar and the elevation member to link the movement of the main bar to the elevation member, and
    the interlock means comprising:
    an interruption member provided at the main bar and having a longitudinal groove in a direction perpendicular to the movement of the main bar;
    a first link having a first end located at the longitudinal groove of the interruption member, wherein the first end of the first link is movable along the longitudinal groove; and
    a second link having a first end shaft-coupled to a second end of the first link, and a second end shaft-coupled to the elevation member, wherein the second link is enabled to push downward or pull upward the elevation member by a movement of the first link.

5. The interlock device of claim 4, further comprising a guide means provided between the opening and closing plate and the elevation member,
    wherein the guide means comprises:
    rollers provided at a first side thereof to allow for efficient raising or lowering of the elevation member; and
    a longitudinal guide hole formed in a direction of movement of the opening and closing plate at a second side thereof to guide the movement of the opening and closing plate.

* * * * *